United States Patent Office 3,055,899
Patented Sept. 25, 1962

3,055,899
N-PYRAZINYL-BENZENE SULFONAMIDES
Jean Druey, Riehen, Paul Schmidt, Therwil, Kurt Eichenberger and Max Wilhelm, Basel, Switzerland, assignors to Ciba Corporation, a corporation of Delaware
No Drawing. Filed Aug. 19, 1959, Ser. No. 834,664
Claims priority, application Switzerland Sept. 5, 1958
13 Claims. (Cl. 260—250)

The present invention relates to sulfonamides of the formula

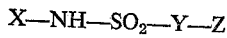

in which X represents a pyridazine radical; Y a 1:4-phenylene radical and Z represents a hydrogen atom or an aliphatic or alicyclic hydrocarbon radical, a free, etherified or esterified hydroxyl group, a free or etherified mercapto group, or a halogen atom—and of N-acyl compounds and salts thereof and to processes for preparing same.

The substituent Z in the para-position of the phenyl radical is more especially a lower alkyl radical such as propyl or ethyl, above all methyl, or a cycloaliphatic radical, for example, cyclopentyl or cyclohexyl, a lower alkoxy- or alkylmercapto group such as ethoxy, propoxy, ethylmercapto or propylmercapto, above all methoxy, methylmercapto or methylenedioxy groups, or a halogen atom such as fluorine, chlorine, bromine or iodine. The 1:4-phenylene radical Y may alternatively be substituted in the other positions, for example by one or several of the specified substituents, or by free or substituted amino groups such as mono- or diloweralkylamino groups or by nitro groups. An acyl radical at the sulfonamide nitrogen atom is preferably a lower fatty acid radical, for example an acetyl group.

The new compounds possess valuable pharmacological properties. They assist the functioning of the liver in liver complaints and can thus be used as medicaments.

Of special value are compounds of the formula

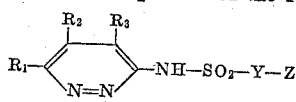

in which $R_1$, $R_2$ and $R_3$ represent hydrogen atoms or lower radicals and $R_1$ may also be a halogen such as a chlorine or bromine atom, a free or etherified hydroxyl or mercapto group, for example a lower alkoxy- or lower alkylmercapto group such as methoxy, ethoxy, propoxy, methylmercapto group or the like, or an alkylsulfonyl group such as lower alkylsulfonyl group, e.g. methyl- or ethyl sulfonyl, and Y and Z have the meanings defined above. Special mention deserve the compounds of the formula

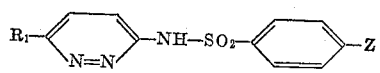

in which $R_1$ has the above meaning and Z stands for a lower alkyl group such as a methyl radical or for a halogen atom such as chlorine or for hydrogen.

The new compounds can be made by the methods as such known.

The process consists, for example, in reacting a compound each of the formula

in which X, Y and Z have the meanings defined above and $X_1$ and $Y_1$ represent radicals eliminated in the course of the reaction, except for an imino group —NH— contained in $X_1$ or in $Y_1$.

It is possible, for example, to react a benzenesulfonyl halide which is unsubstituted in the para-position or substituted as described above, and which may contain further substituents, more especially a chloride, for example toluenesulfonyl chloride, with a heterocyclic amine of the formula X—NH$_2$. The reaction according to the invention is advantageously performed in the presence of a diluent and/or condensing agent, such as anhydrous pyridine. The reaction takes place even under mild conditions, for example at room temperature. It is of advantage to initiate the reaction at room temperature and to heat the reaction mixture on a steam bath after the exothermic reaction has subsided.

Alternatively, a heterocyclic halogen compound of the formula X—Hal, in which Hal represents a mobile halogen atom, can be reacted with a sulfonamide of the formula H$_2$N—SO$_2$—Y—Z, advantageously with the use of a metal salt of the sulfonamide or in the presence of a condensing agent capable of forming such salts.

In a resulting bis-benzenesulfonyl compound a sulfonyl radical is eliminated in the usual manner by hydrolysis or aminolysis whereby a further final compound is formed when an amine of the formula X—NH$_2$ was used.

In the resulting compounds reactive substituents can be replaced in the usual manner by hydrogen or by other substituents within the scope of the final compounds. For example: An activated halogen atom—such as a chlorine or bromine atom—in the 3-position of the pyridazine ring may be removed by reduction in the usual manner or converted by treatment with a hydrolysing agent into a hydroxyl group; with a metal alcoholate or mercaptide into the corresponding etherified hydroxyl or mercapto group; with a metal hydrosulfide or thiourea into the free mercapto group; or with a salt of a sulfinic acid into the corresponding sulfonyl groups, etherified oxy groups may easily be hydrolysed to the free hydroxy group.

From the new compounds, N-acyl derivatives or salts can be prepared by known methods. They may be reacted, for example, with acid halides or anhydrides or with bases, such as a hydroxide of an alkali metal or alkaline earth metal, such as sodium, potassium, calcium or magnesium.

The starting materials are known or can be made by known methods.

The new compounds and their salts can be used as medicaments, for example in the form of pharmaceuticals containing them in admixture with an organic, solid or liquid excipient suitable for enteral or parenteral administration. As excipient are suitable substances that do not react with the new compounds, such as water, gelatine, lactose, starches, colloidal silicic acid, magnesium stearate, talc, vegetable oils, benzyl alcohols, gums, polyalkylene glycols, white petroleum jelly, cholesterol or other known pharmaceutical excipients. The pharmaceutical preparations may be, for example, tablets or dragees or in liquid form solutions, suspensions or emulsions. If desired, they are sterilized and/or contain assistants, such as preserving, stabilizing, wetting or emulsifying agents, salts for controlling the osmotic pressure, or buffer substances. They may also contain further therapeutically useful substances. The preparations are formulated by the usual methods.

The following example illustrates the invention.

*Example 1*

19.1 grams of para-toluenesulfonyl chloride are added within about 10 minutes to a solution of 12.9 grams of 3-chloro-6-aminopyridazine in 80 cc. of anhydrous pyridine. After the reaction has subsided, the reaction solution is heated for one hour at an internal temperature of 90–95° C. It is then poured into 500 cc. of N-hydrochloric acid, allowed to stand overnight, and the precipitate formed is suctioned off, dissolved in 250 cc. of 0.5 N-sodium hydroxide solution, and a small amount of undissolved matter is suctioned off. The filtrate is adjusted with 2 N-hydrochloric acid to pH=3–4, and the precipitate is again filtered off and recrystallized from alcohol, to yield 6-(para-toluenesulfonamido)-3-chloropyridazine of the formula

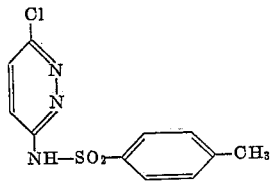

in the form of colorless crystals melting at 152–153° C.

When 6-(para-toluenesulfonamido)-3-chloropyridazine is heated in a sealed tube with a methanolic or ethanolic solution of sodium methylate, 6-(para-toluenesulfonamido)-3-methoxy- and -ethoxy-pyridazine respectively is obtained.

In a similar manner 6-(para-toluenesulfonamide)-3-chloro-pyridazine yields on reaction With sodium hydroxide solution: 3-hydroxy-,
With thiourea: 3-mercapto-,
With sodium methylmercaptan: 3-methylmercapto-,
With sodium ethylmercaptan: 3-ethylmercapto-,
With sodium methanesulfinate: 3 - methylsulfonyl - 6-(para-toluenesulfonamido)-pyridazine and, by treatment with hydrogen in an alkaline solution in the presence of a platinum+palladium+carbon catalyst, it yields 3-(para-toluenesulfonamido)-pyridazine.

When in the above example para-toluenesulfonyl chloride is replaced by benzenesulfonyl chloride, ortho-toluenesulfonyl-chloride or para-chlorobenzenesulfonyl chloride, there are obtain 3-chloro-, hydroxy-, mercapto-, methoxy-, ethoxy-, methylmercapto-, ethylmercapto- or methanesulfonyl-6-benzene-sulfonamido-, ortho-toluene-sulfonamido- or para-chlorobenzene-sulfonamido-pyridazine or the corresponding compounds unsubstituted in the 3-position.

*Example 2*

14 grams of 6-(p-toluene-sulfonamide)-3-chloro-pyridazine are heated in a closed tube for 12 hours at 150–160° C. with a solution prepared from 5 grams of sodium and 150 cc. of methanol. A small amount of precipitated sodium chloride is filtered off with suction, and the filtrate is evaporated to dryness under reduced pressure. The residue, 6-(p-toluene-sulfonamido)-3-methoxy-pyridazine, is dissolved in water and the solution adjusted to pH 2–3 with N-hydrochloric acid, whereupon a solid precipitate is formed which is filtered with suction. The product is recrystallized from alcohol. 6-(p-toluene-sulfonamido)-3-hydroxy-pyridazine of the formula

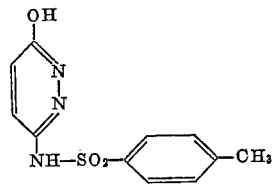

is thus obtained in the form of colorless crystals melting at 243–245° C.

What we claim is:

1. A member selected from the group consisting of sulfonamides of the formula:

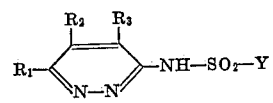

in which one of the substituents $R_2$ and $R_3$ stands for a member selected from the group consisting of hydrogen and lower alkyl and the other for lower alkyl and $R_1$ represents a member selected from the group consisting of hydrogen, lower alkyl, halogen, hydroxy, lower alkoxy, mercapto, lower alkyl mercapto and lower alkyl sulfonyl and Y is a member selected from the group consisting of lower alkylphenyl, lower alkoxy-phenyl, methylenedioxyphenyl and lower alkylmercaptophenyl, and N-lower alkanoyl derivatives and alkali metal and alkaline earth metals salts thereof.

2. A member selected from the group consisting of sulfonamides of the formula:

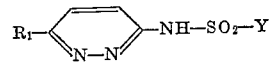

in which $R_1$ represents a member selected from the group consisting of hydrogen, lower alkyl, halogen, hydroxy, lower alkoxy, mercapto, lower alkyl mercapto and lower alkyl sulfonyl and Y is a member selected from the group consisting of m-lower alkylphenyl, o-lower alkylphenyl, m-lower alkoxyphenyl, o-lower alkoxyphenyl and m-lower alkylmercaptophenyl and o-lower alkylmercaptophenyl, and N-lower alkanoyl derivatives and alkali metal and alkaline earth metal salts thereof.

3. A member selected from the group consisting of sulfonamides of the formula:

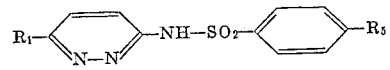

in which $R_5$ stands for lower alkyl and $R_1$ for a member selected from the group consisting of hydrogen, lower alkyl, halogen, hydroxy, lower alkoxy, mercapto, lower alkyl mercapto and lower alkyl sulfonyl and N-lower alkanoyl derivatives and alkali metal and alkaline earth metal salts thereof.

4. A member selected from the group consisting of sulfonamides of the formula

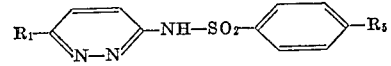

in which $R_5$ stands for lower alkoxy and $R_1$ for a member selected from the group consisting of hydrogen, lower alkyl, halogen, hydroxy, lower alkoxy, mercapto, lower alkyl mercapto and lower alkyl sulfonyl and N-lower alkanoyl derivatives and alkali metal and alkaline earth metal salts thereof.

5. A member selected from the group consisting of sulfonamides of the formula

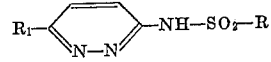

in which R stands for methylenedioxyphenyl and $R_1$ for a member selected from the group consisting of hydrogen, lower alkyl, halogen, hydroxy, lower alkoxy, mercapto, lower alkyl mercapto and lower alkyl sulfonyl and N-lower alkanoyl derivatives and alkali metal and alkaline earth metal salts thereof.

6. A member selected from the group consisting of sulfonamides of the formula

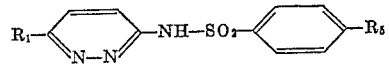

in which $R_5$ stands for lower alkyl-mercapto and $R_1$ for a member selected from the group consisting of hydrogen, lower alkyl, halogen, hydroxy, lower alkoxy, mercapto, lower alkyl mercapto and lower alkyl sulfonyl and N-lower alkanoyl derivatives and alkali metal and alkaline earth metal salts thereof.

7. 3-chloro-6-(para-toluenesulfonamido)-pyridazine.
8. 3-lower alkoxy-6-(para-toluenesulfonamido)-pyridazine.
9. 3-lower alkylmercapto-6-(para-toluenesulfonamido)-pyridazine.

10. 3-(para-toluenesulfonamido)-pyridazine.
11. 3 - lower alkylsulfonyl-6-(para - toluenesulfonamido)-pyridazine.
12. 3 - hydroxy - 6 - (para-toluenesulfonamido)-pyridazine.
13. 3 - methoxy-6-(para-toluenesulfonamido) - pyridazine.

References Cited in the file of this patent

UNITED STATES PATENTS

| | | |
|---|---|---|
| 2,371,115 | Winnek et al. | Mar. 6, 1945 |
| 2,494,524 | Sprague | Jan. 10, 1950 |
| 2,519,314 | Hultquist et al. | Aug. 15, 1950 |
| 2,524,802 | Hultquist et al. | Oct. 10, 1950 |
| 2,542,856 | Wright et al. | Feb. 20, 1951 |
| 2,563,725 | Hultquist et al. | Aug. 7, 1951 |
| 2,572,728 | Hultquist et al. | Oct. 23, 1951 |
| 2,712,012 | Clark | June 28, 1955 |
| 2,833,761 | Murphy | May 6, 1958 |

FOREIGN PATENTS

| | | |
|---|---|---|
| 615,328 | Great Britain | Jan. 5, 1949 |
| 1,018,423 | Germany | Oct. 31, 1957 |

OTHER REFERENCES

Gregory et al.: J. Chem. Soc. (1949), part II, pp. 2066–9.